(12) United States Patent
Huang

(10) Patent No.: US 6,580,557 B2
(45) Date of Patent: Jun. 17, 2003

(54) SINGLE LENS INSTANTANEOUS 3D IMAGE TAKING DEVICE

(75) Inventor: Ching-Long Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 121 days.

(21) Appl. No.: 09/792,213

(22) Filed: Feb. 20, 2001

(65) Prior Publication Data
US 2002/0071177 A1 Jun. 13, 2002

(30) Foreign Application Priority Data

Dec. 12, 2000 (TW) ........................................ 89126413 A

(51) Int. Cl.⁷ ............................................ G02B 27/22
(52) U.S. Cl. ........................ 359/462; 348/60; 382/164; 382/285
(58) Field of Search ........................ 359/462, 233–236, 359/238–240, 370–371, 386–387, 738–740, 464; 348/60, 50, 49, 45; 382/154, 164, 285; 396/333, 331, 324, 326; 352/60

(56) References Cited

U.S. PATENT DOCUMENTS

| | | | | |
|---|---|---|---|---|
| 593,993 A | * | 11/1897 | Elwood | 359/738 |
| 2,530,793 A | * | 11/1950 | Thomas | 352/84 |
| 3,573,353 A | * | 4/1971 | Henriques et al. | 600/111 |
| 4,410,613 A | * | 10/1983 | Soskuthy | 355/35 |
| 5,222,477 A | * | 6/1993 | Lia | 348/45 |
| 5,585,616 A | * | 12/1996 | Roxby et al. | 235/454 |
| 5,784,098 A | * | 7/1998 | Shoji et al. | 348/139 |

* cited by examiner

*Primary Examiner*—Thong Nguyen
*Assistant Examiner*—Jesse Rowe
(74) *Attorney, Agent, or Firm*—W. Wayne Liauh

(57) ABSTRACT

The present invention discloses a single lens instantaneous 3D image taking device for the application in digital image taking. The digital image taking device contains a lens, an aperture disk and a single sensor installed and aligned in a straight line. The aperture disk has three off-optical-axis apertures with different angular coordinates that are installed with red, blue, and green filters, respectively, for light to pass through. When light passes through the lens and the three apertures on the aperture disk, it will be projected onto the sensor, giving image and color information from three different perspectives. Finally, through color separation and image correlation, a precise 3D range image and color information can be obtained.

8 Claims, 4 Drawing Sheets

SINGLE LENS INSTANTANEOUS 3D IMAGE TAKING DEVICE

BACKGROUND OF THE INVENTION

1. Field of Invention

The present invention relates to a single lens instantaneous 3D image taking device in the application of digital image taking devices.

2. Related Art

As shown in FIG. 1, a usual method of obtaining the three-dimensional image of an object 4 is to use two cameras 1, 2 to simultaneously take its images from different perspectives and to use a third camera 3 to shoot for texture mapping (the area enclosed by the paired dashed lines in FIG. 1, showing the angles for taking the pictures of the object 4 by the cameras 1, 2, 3). Through image correlation (the overlapping areas in the images taken by the cameras 1, 2 are correlated so that the same points of the object 4 on the pictures can be associated with each other) and triangulation reconstruction, the three-dimensional information of the object 4 is recovered. In addition, some systems use active light source to produce special projection pattern to replace the above-mentioned camera 2 and obtain the three-dimensional information of the object 4 using special decoding methods. Some others use laser scanning and take pictures step by step in order to obtain the three-dimensional information.

When one wants to record the colors on the object surfaces, the camera 3 has to be a color camera. Color texture mapping has to be made too in order to obtain a colorful image of the object 4.

When the previously mentioned technology is used in obtaining colorful 3D information, several complicated hardware systems and algorithms have to be employed. However, it is still not available to have convenient, colorful and instantaneous 3D precise image taking.

SUMMARY OF THE INVENTION

It is then a primary object of the invention to provide a single lens instantaneous 3D image taking device so as to quickly take a precise 3D shape and its color information.

The disclosed single lens instantaneous 3D image taking device contains a lens, an aperture disk and a single sensor installed and aligned in a straight line. The aperture disk has three off-optical-axis apertures with different angular coordinates for light to pass through. When in use, light first passes through the lens, followed by the three apertures on the aperture disk. Therefore, images from the three apertures (with different angles) are projected onto the sensor, giving images from three different angles. Finally, through active or passive image correlation, a precise 3D range image can be obtained.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
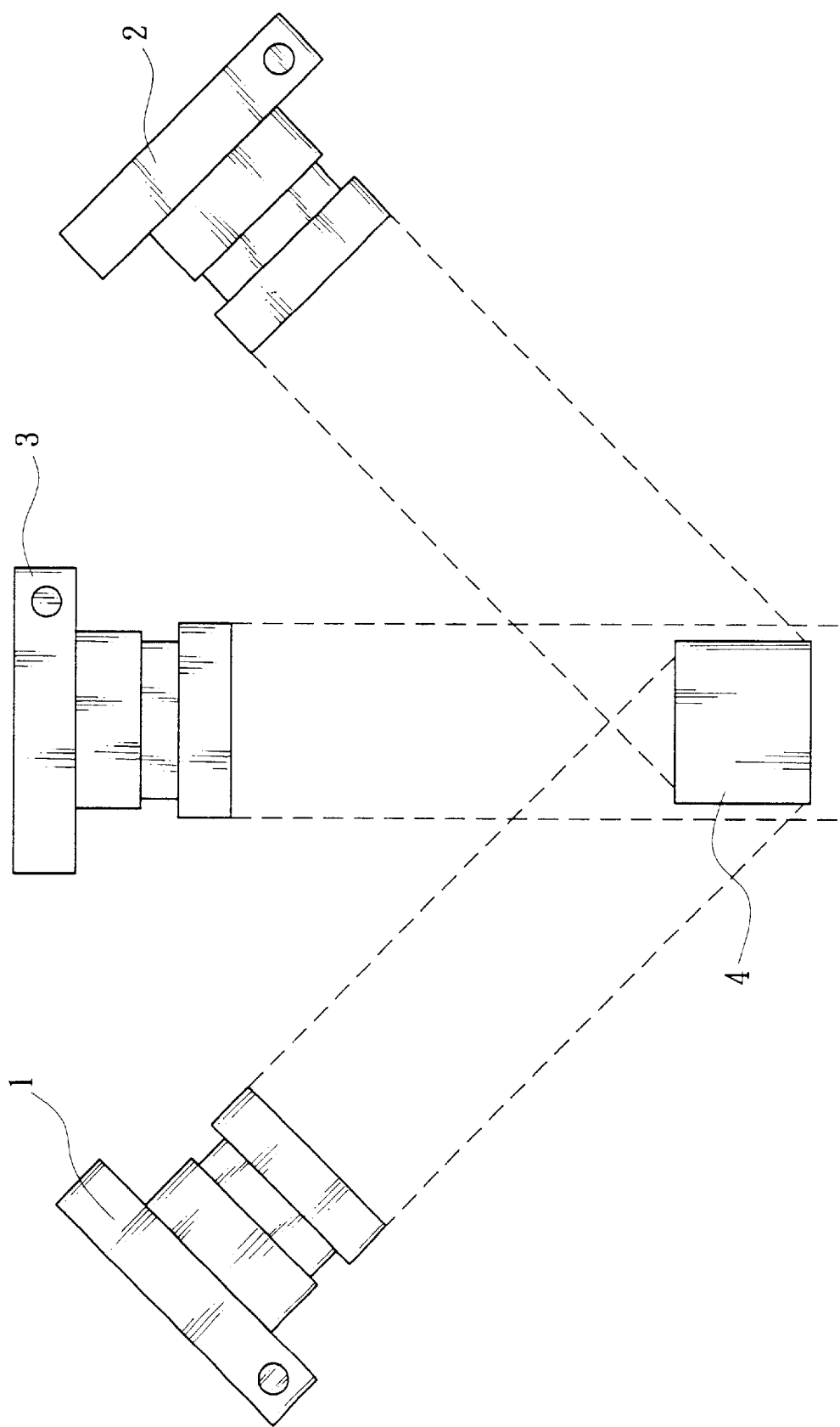
FIG. 1 shows the relative positions of a camera in the prior art and an object.
Figure 2:
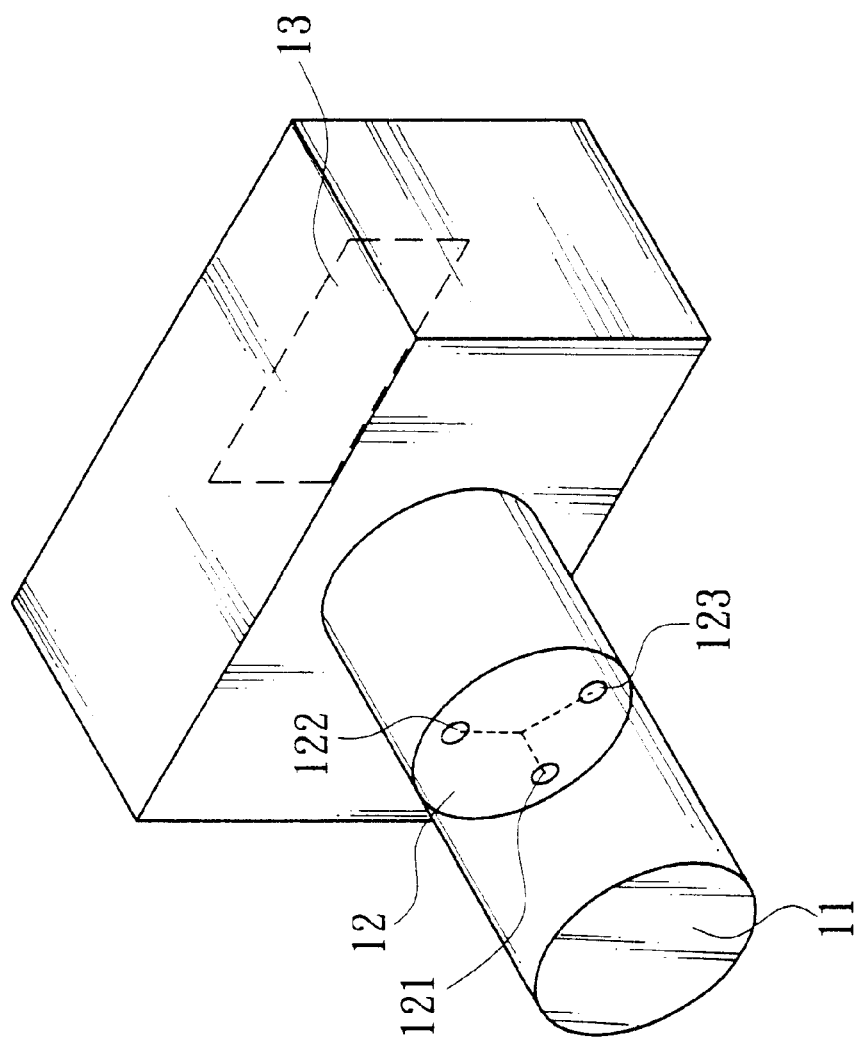
FIG. 2 shows a structure of the invention.

As shown in FIG. 2, the disclosed single lens instantaneous 3D image taking device contains a lens 11, an aperture disk 12 and a single sensor 13 installed and aligned in a straight line. The aperture disk 12 has three off-optical-axis apertures 121, 122, 123 with different angular coordinates for light to pass through. The single sensor 13 can be a matrix charge-coupled device (CCD) or a matrix complementary metal-oxide semiconductor (CMOS) sensor, which uses its light sensitivity to convert the information projected thereon into image data for storage. When computing three-dimensional information, one only needs to know the distances between the apertures 121, 122, 123 without detailed information about precise distance measurement among cameras, as in conventional setups. So the operation is much simpler.

When in use, light 20 first passes through the lens 11, followed by the three apertures 121, 122, 123 on the aperture disk 12. Therefore, images from the three apertures (with different angles) are projected onto the sensor 13, giving images from three different angles. Finally, through active or passive image correlation, a precise 3D range image can be obtained. That is, as long as the real image is not formed on the focal plane of the digital image taking device, the image projected on the sensor 13 will generate disparity as the positions of the off-optical-axis apertures change. Utilizing this disparity and the triangulation reconstruction, the three-dimensional coordinates of the image can be obtained.

Figure 3:
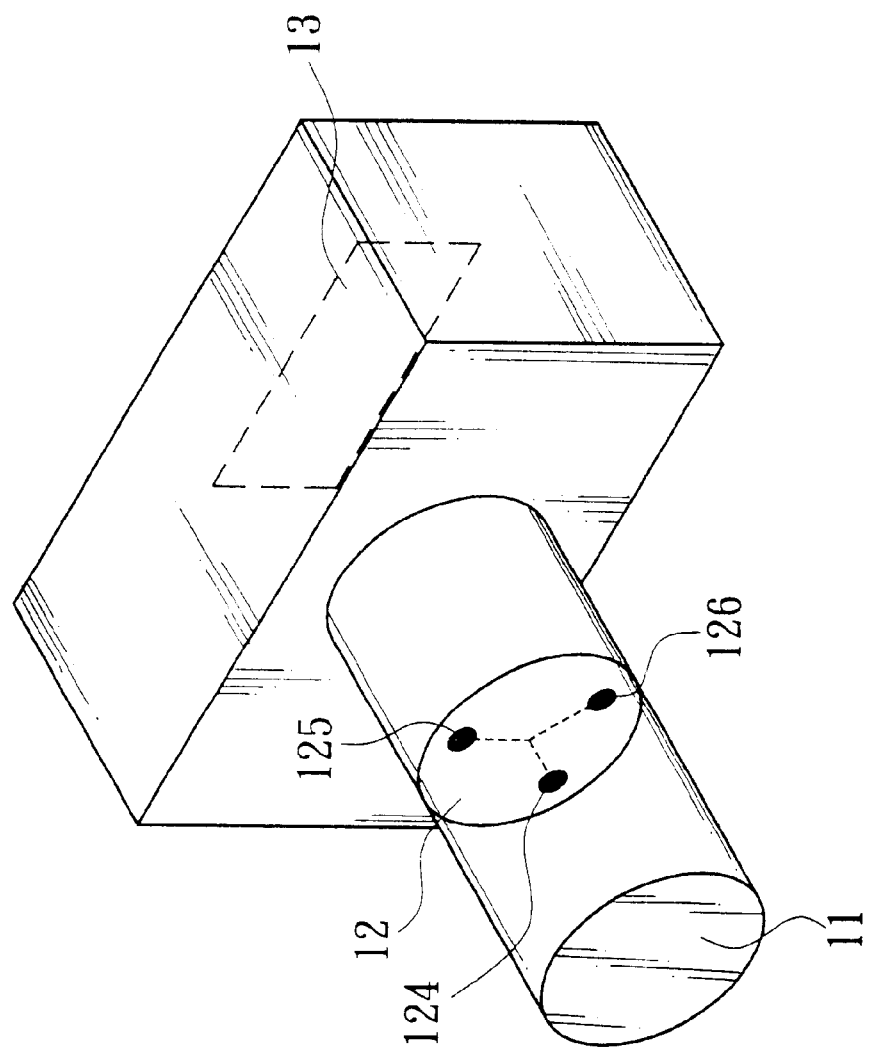
FIG. 3 shows a structure of the invention after being installed with color filters on the apertures.

With reference to FIG. 3, another embodiment of the invention is to install filters 124, 125, 126 of different colors (such as RGB filters) at the apertures 121, 122, 123. After color separation, images from different perspectives can be obtained. Range data can be calculated through correlation processes. Furthermore, the color information at a particular position can be obtained by combining intensities of that particular position in three images. This method is different from the conventional method, which utilizes position mapping to obtain the object colors and is more likely misplaced.

Figure 4:
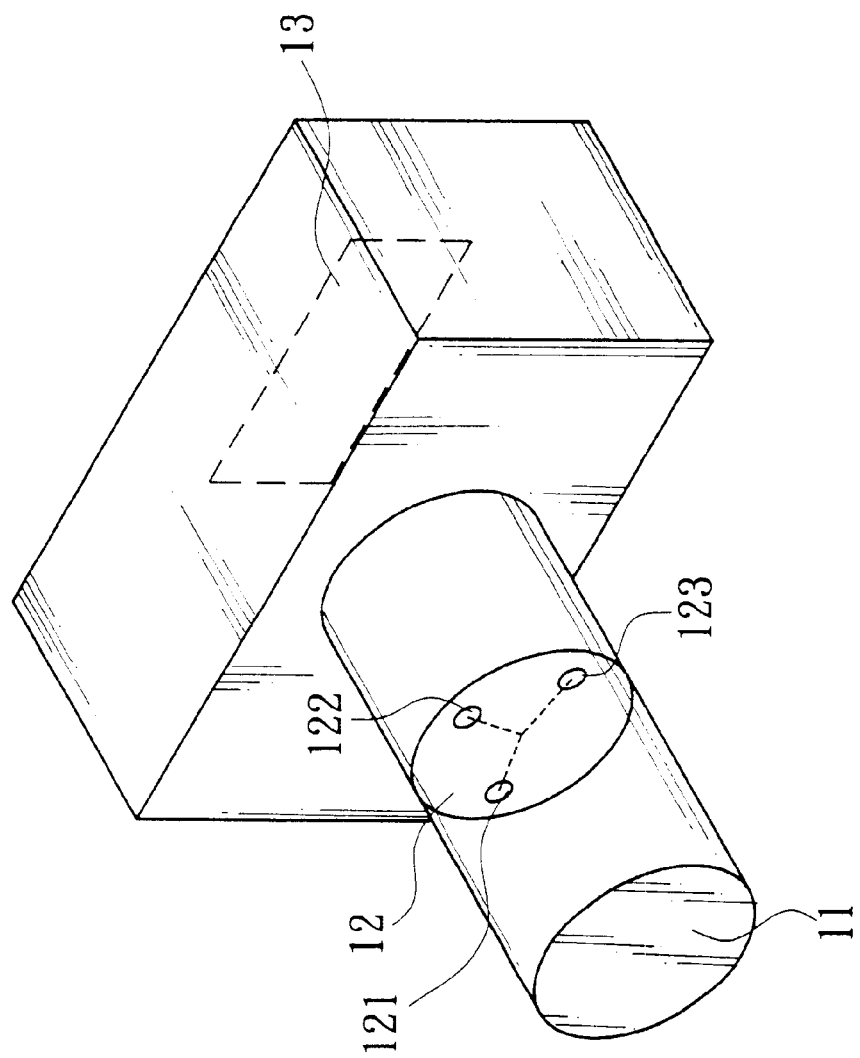
FIG. 4 is another schematic view showing different arrangement of the apertures according to the invention.

As shown in FIG. 4, a further embodiment of the invention is to change the positions of the apertures 121, 122, 123. That is, their positions can be any three positions within the whole aperture disk 12. The aperture disk can be rotated or shifted to increase the accuracy of three-dimensional data.

Effects of the Invention

In accordance with the disclosed single lens instantaneous 3D image taking device, the following effects can be achieved:

1. It can simultaneously record the images of an object from three perspectives, therefore the precise 3D shape of the object can be extracted.
2. It only uses a single lens, rather than more than two lens in conventional devices. Thus, it is fairly convenient in use and does not need calibration in mounting the cameras.
3. Color filters are installed on the aperture disk for separating information on both colors and views from different angles.
4. The user only needs to press one button to obtain the 3D image he wants at one instant.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A 3D image taking device for use in digital image taking, comprising:

a single lens to collect light from an object;

an aperture disk in association with the single lens, the aperture disk containing at least three apertures that are formed on the same aperture disk but are spaced apart from each other; and a sensor assembly in alignment with the aperture disk for converting light passing through the apertures into image data for storage;

wherein the apertures are arranged such that the same light that passes through the single lens will pass through the apertures simultaneously so as to obtain an image in a single instant with at least three perspectives of the object that through an image correlation process produces a 3D image.

2. The 3D image taking device of claim 1, wherein the single lens has an optical axis and the apertures are disposed off the optical axis and separated by equal angles relative to each other.

3. The 3D image taking device of claim 1, wherein the single lens has an optical axis and the apertures are disposed off the optical axis and at least two of the apertures are separated by different angles.

4. The 3D image taking device of claim 1, wherein the apertures are installed with different-color filters.

5. The 3D image taking device of claim 4, wherein the different-color filters are red, blue and green color filters.

6. The 3D image taking device of claim 1, wherein the sensor is a charge-coupled device (CCD).

7. The 3D image taking device of claim 1, wherein the sensor is a complementary metal-oxide semiconductor (CMOS) sensor.

8. The 3D image taking device of claim 1, wherein the single lens has an optical axis and the apertures are disposed off the optical axis.

* * * * *